US 8,934,359 B2

(12) United States Patent
Zhang et al.

(10) Patent No.: US 8,934,359 B2
(45) Date of Patent: Jan. 13, 2015

(54) METHOD AND PASSIVE OPTICAL NETWORK SYSTEM FOR MANAGING UPLINK BURST OVERHEAD PARAMETERS

(75) Inventors: Dezhi Zhang, Guangdong Province (CN); Marek Hajduczenia, Fiaes (PT); Liquan Yuan, Guangdong Province (CN); Weiliang Zhang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 474 days.

(21) Appl. No.: 13/257,621

(22) PCT Filed: Jun. 10, 2010

(86) PCT No.: PCT/CN2010/073773
§ 371 (c)(1),
(2), (4) Date: Apr. 2, 2012

(87) PCT Pub. No.: WO2010/145494
PCT Pub. Date: Dec. 23, 2010

(65) Prior Publication Data
US 2012/0213509 A1 Aug. 23, 2012

(30) Foreign Application Priority Data
Nov. 4, 2009 (CN) .......................... 2009 1 0212093

(51) Int. Cl.
*H04L 12/44* (2006.01)
*H04L 12/28* (2006.01)
(Continued)

(52) U.S. Cl.
CPC ........ *H04L 12/2861* (2013.01); *H04B 10/0793* (2013.01); *H04L 12/2885* (2013.01);
(Continued)

(58) Field of Classification Search
USPC ........................................... 370/252
See application file for complete search history.

(56) References Cited

U.S. PATENT DOCUMENTS 7,600,171 B2 * 10/2009 Lee et al. .................... 714/751
8,041,216 B2 * 10/2011 de Lind van Wijngaarden ................ 398/71
(Continued)

FOREIGN PATENT DOCUMENTS

| CN | 1677898 A | 10/2005 |
| CN | 101346958 A | 1/2009 |
| JP | 2000278281 A | 10/2000 |

OTHER PUBLICATIONS

"Gigabit-capable Passive Optical Networks (G-PON): Transmission convergence layer specification"; Recommendation ITU-T G.984.3; Mar. 2008; Series G: Transmission Systems and Media, Digital Sysytems and Networks; Digital sections and digital line system—Optical line systems for local and access networks; XP17588388A; the whole document.
(Continued)

*Primary Examiner* — Melvin Marcelo
*Assistant Examiner* — Peter Solinsky
(74) *Attorney, Agent, or Firm* — Ling Wu; Stephen Yang; Ling and Yang Intellectual Property

(57) ABSTRACT

A method for managing upstream burst overhead parameters includes: an Optical Line Terminal (OLT) or an Optical Network Unit (ONU) detects transmission quality of a downlink between the OLT and the ONU; the OLT or the ONU determines the upstream burst overhead parameters suitable for the ONU according to the transmission quality; and the ONU starts to use the upstream burst overhead parameters suitable for the ONU after the switching time determined by the ONU itself or indicated by the OLT. The present invention also provides an ONU and an OLT for managing the upstream burst overhead parameters. The present invention can improve the bandwidth utilization rate and decrease the complexity of indicating the upstream burst overhead parameters in PON system, so that the ONU and the OLT are enabled to flexibly and simply select the upstream burst overhead parameters.

15 Claims, 8 Drawing Sheets

(51) Int. Cl.
*H04B 10/079* (2013.01)
*H04L 12/54* (2013.01)
*H04Q 11/00* (2006.01)

(52) U.S. Cl.
CPC ........ H04L12/5695 (2013.01); *H04Q 11/0066* (2013.01); H04Q 11/0067 (2013.01); *H04Q 2011/0064* (2013.01); *H04Q 2011/0084* (2013.01)
USPC .......................................................... 370/252

(56) References Cited

U.S. PATENT DOCUMENTS 8,195,050 B2 * 6/2012 Matsuyama et al. .......... 398/102
2002/0051455 A1 5/2002 Lee et al.
2010/0208747 A1 * 8/2010 Gordon et al. ................ 370/468

OTHER PUBLICATIONS

"Reliable Multicast with ARQ and FEC for streaming HDTV"; Shuichi Aoki et al.; NHK Science and Technical Research Laboratories; Jan. 10, 2011 kinuta Setagaya-ku, Tokyo 157-8510 Japan; E-mail: aoki.s-ha@nhk.or.jp; see pp. 2-9/E.

International Search Report for PCT/CN2010/073773 dated Aug. 24, 2010.

* cited by examiner

METHOD AND PASSIVE OPTICAL NETWORK SYSTEM FOR MANAGING UPLINK BURST OVERHEAD PARAMETERS

TECHNICAL FIELD

The present invention relates to the field of optical communication technology, and more particularly, to a method for assigning and managing upstream burst overhead parameters used between an optical line terminal (OLT) and an Optical Network Unit (ONU) in a passive optical network (PON) system and the passive optical network system.

BACKGROUND OF THE RELATED ART

In the PON technology, it needs consistent upstream burst overhead parameters (i.e., parameters of upstream burst overhead) in the OLT and the ONU: the ONU sends upstream frames according to the determined upstream burst overhead parameters; the OLT correctly receives the upstream frames also according to the determined upstream burst overhead parameters. Based on this premise, the PON can work properly. Generally, the upstream burst overhead parameters include:

(1) State (on or off) of Forward Error Correction (FEC);

(2) Delimiter, which has a variable length and can be suitable to different optical fiber link quality;

(3) Preamble, which typically is a constant, but also may be several constants for selecting, and relates to different optical fiber link quality and performance of the optical module; and (4) Guard band (Guard time), which is the number of bits of the guard band, and generally has a constant length.

In the existing ITU G.984.3 GPON technology standard, these upstream burst overhead parameters are determined between the OLT and the ONU according to the following method: in a register process which starts up periodically, the OLT broadcasts a part of the upstream burst overhead parameters required by the OLT, including the parameters (2), (3) and (4) in the above-mentioned upstream burst overhead parameters, to all ONUs which communicate with the OLT. As shown in FIG. 1, after the ONU acquires downstream physical layer synchronization and enters into a waiting state (i.e., O2 state), it continuously monitors a message carrying the part of the upstream burst overhead parameters broadcasted by the OLT in the downlink; once the message is received successfully, the ONU records the carried upstream burst overhead parameters, and then transfers to a serial number state (i.e., O3 state); and the ONU uses these received upstream burst overhead parameters in the subsequent working process without modification.

In addition, in the existing Gigabit Passive Optical Network (GPON) standards, state notification mechanism of the parameter (1) FEC in the upstream burst overhead parameters is independent from communication mechanism of the above-mentioned parameters (2), (3) and (4). The on/off notification of the parameter (1) FEC is indicated in real time by a fixed indication bit in a tag field assigned for each upstream burst bandwidth of each ONU in a bandwidth assignment field of the downstream frame.

CONTENT OF THE INVENTION

The actual implementation in the prior art has two problems:

Complexity problem: indications of the upstream burst overhead parameters in the GPON system are performed separately, thus it has high complexity.

Efficiency problem: Once the ONU in the GPON system determines the upstream burst overhead parameters such as preamble and delimiter, these parameters are not updated any more; after the quality of some links is improved, and at the time relatively short preamble is allowed to be used for upstream communication, there is no corresponding mechanism provided for negotiation, and the original upstream burst overhead parameters are forced to be used for upstream communication, which is not flexible and cannot improve bandwidth efficiency along with quality improvement of the link.

The present invention provides a method for managing upstream burst overhead parameters between optical access nodes to improve the bandwidth utilization.

In order to solve the above problem, the present invention provides a method for managing the upstream burst overhead parameters, comprising:

an optical line terminal (OLT) or an optical network unit (ONU) detecting transmission quality of a downlink between the OLT and the ONU;

The OLT or the ONU determining upstream burst overhead parameters suitable for the ONU according to the transmission quality; and The ONU starting to use the upstream burst overhead parameters suitable for the ONU after the switching time determined by the ONU itself or indicated by the OLT.

Before the step of the OLT or the ONU detecting the transmission quality of the downlink between the OLT and the ONU, the method further comprises:

the OLT determining and identifying N kinds of upstream burst overhead parameter sets according to different levels of link quality; wherein, N is an integer and is larger than zero; and the OLT sending a parameter value or an identification of one default upstream burst overhead parameter set to the ONU, and the ONU receiving the parameter value or the identification of the upstream burst overhead parameter set in a waiting state and using the upstream burst overhead parameter set; or, the OLT sending parameter values or identifications of more than one upstream burst overhead parameter set to the ONU, and the ONU receiving the parameter values or the identifications of the more than one upstream burst overhead parameter set in a waiting state and using one of the more than one upstream burst overhead parameter set.

After the step of the ONU receiving the parameter value(s) or the identification(s) of the upstream burst overhead parameter set(s), the method further comprises: the ONU entering into a serial number state;

the step of the OLT detecting the transmission quality of the downlink between the OLT and the ONU comprises: in the serial number state of the ONU, the OLT detecting the downlink between the ONU and the OLT to acquire the quality information of the downlink;

the step of the OLT determining the upstream burst overhead parameters suitable for the ONU according to the transmission quality comprises: the OLT determining the upstream burst overhead parameter set(s) suitable for the ONU according to the quality information of the downlink, and notifying the parameter value(s) or the identification(s) of the upstream burst overhead parameter set(s) suitable for the ONU to the ONU via a unicast message or a broadcast message.

After the step of the ONU receiving the parameter value(s) or the identification(s) of the upstream burst overhead parameter set(s), the method further comprises: the ONU entering into a serial number state;

the step of the ONU detecting the transmission quality of the downlink between the OLT and the ONU comprises: in the serial number state of the ONU, the ONU detects the downlink between the ONU and the OLT to acquire the quality information of the downlink;

after the step of acquiring the quality information of the downlink, the method further comprises: the ONU notifying the quality information of the downlink to the OLT;

the step of the OLT determining the upstream burst overhead parameters suitable for the ONU according to the transmission quality comprises: the OLT determining the upstream burst overhead parameter set(s) suitable for the ONU according to the quality information of the downlink, and notifying the parameter value(s) or the identification(s) of the upstream burst overhead parameter set(s) suitable for the ONU to the ONU via a unicast message or a broadcast message.

After the step of the ONU receiving the parameter value(s) or the identification(s) of the upstream burst overhead parameter set(s), the method further comprises: the ONU entering into a serial number state;

the step of the ONU detecting the transmission quality of the downlink between the OLT and the ONU comprises: in the serial number state of the ONU, the ONU detecting the downlink between the ONU and the OLT to acquire the quality information of the downlink;

the step of the ONU determining the upstream burst overhead parameters suitable for the ONU according to the transmission quality comprises: the ONU determining the upstream burst overhead parameter set(s) suitable for the ONU according to the quality information of the downlink, and notifying the parameter value(s) or the identification(s) of the upstream burst overhead parameter set(s) suitable for the ONU to the OLT via a unicast message or a broadcast message.

While or after the OLT notifies the ONU the parameter value(s) or the identification(s) of the determined upstream burst overhead parameter set(s), or while or after the ONU notifies the OLT the parameter value(s) or the identification(s) of the determined upstream burst overhead parameter set(s), the method further comprises: the OLT setting a switching index value of the upstream burst overhead parameters in the tag field assigned for the bandwidth of the ONU and sending it to the ONU via a downstream frame; the step of the ONU starting to use the upstream burst overhead parameters after the switching time indicated by the OLT comprises: after the ONU receives the switching index value, it using the upstream burst overhead parameters suitable for the ONU in the next frame; or while or after the OLT notifies the ONU the parameter value(s) or the identification(s) of the determined upstream burst overhead parameter set(s), or while or after the ONU notifies the OLT the parameter value(s) or the identification(s) of the determined upstream burst overhead parameter set(s), the method further comprises: the OLT notifying the ONU a hyper frame number; the step of the ONU starting to use the upstream burst overhead parameters after the switching time indicated by the OLT comprises: after the ONU receives the hyper frame number, it starting to use the upstream burst overhead parameters suitable for the ONU after the frame indicated by the hyper frame number arrives; or while or after the OLT notifies the ONU the parameter value(s) or the identification(s) of the determined upstream burst overhead parameter set(s), or while or after the ONU notifies the OLT the parameter value(s) or the identification(s) of the determined upstream burst overhead parameter set, the method further comprises: the ONU notifying the ONU a hyper frame number; the step of the ONU starting to use the upstream burst overhead parameters after the switching time determined by the ONU itself comprises: after the frame indicated by the hyper frame number arrives, the ONU starting to use the upstream burst overhead parameters suitable for the ONU.

The upstream burst overhead parameter set comprises: state of forward error correction, delimiter, preamble, and guard band.

In the step of the OLT sending the parameter values or the identifications of more than one upstream burst overhead parameter set to the ONU, the OLT sends the parameter values or identifications of one or more upstream burst overhead parameter sets to all ONUs or one or more ONUs which communicate with the OLT.

In order to solve the above technical problem, the present invention also provides a PON system for managing the upstream burst overhead parameters, comprising an OLT or an ONU. The OLT is used to detect the transmission quality of the downlink between the OLT and the ONU, determine the upstream burst overhead parameters suitable for the ONU according to the transmission quality and notify the parameters to the ONU; and the OLT is further used to indicate the switching time to the ONU. The ONU is used to detect the transmission quality of the downlink between the OLT and the ONU and determine the upstream burst overhead parameters suitable for the ONU according to the transmission quality; or, the ONU directly receives from the OLT the transmission quality of the downlink determined by the OLT; and the ONU is further used to start to use the upstream burst overhead parameters after the switching time determined by the ONU itself or indicated by the OLT.

In order to solve the above problem, the present invention also provides an ONU for managing the upstream burst overhead parameters, and the ONU comprises a first parameter acquisition module and a switching module; wherein:

the first parameter acquisition module is configured to:

detect transmission quality of a downlink between the OLT and the ONU or receive the transmission quality of the downlink detected and sent by the OLT, determine upstream burst overhead parameters suitable for the ONU according to the transmission quality, and send the upstream burst overhead parameters suitable for the ONU to the OLT; or, detect transmission quality of a downlink between an OLT and the ONU, send the transmission quality to the OLT, and receive from the OLT the upstream burst overhead parameters suitable for the ONU determined according to the transmission quality; or, directly receive from the OLT the upstream burst overhead parameters suitable for the ONU determined by the OLT; and, while or after notifying the OLT the upstream burst overhead parameters suitable for the ONU, or while or after receiving the upstream burst overhead parameters suitable for the ONU sent by the OLT, indicate the switching module;

the switching module is configured to:

while or after receiving an indication from the first parameter acquisition module, determine switching time or receive switching time indicated by the OLT, and start to use the upstream burst overhead parameters suitable for the ONU after the switching time determined by the ONU itself or indicated by the OLT.

The ONU also comprises a burst overhead parameter set receiving module.

The burst overhead parameter set receiving module is configured to: receive, in a waiting state, a parameter value or an identification of one default upstream burst overhead parameter set sent by the OLT to the ONU after the OLT determines and identifies N kinds of upstream burst overhead parameter sets according to different levels of link quality, and use this upstream burst overhead parameter set; or, receive, in a waiting state, parameter values or identifications of more than one upstream burst overhead parameter set sent by the OLT to the ONU after the OLT determines and identifies N kinds of upstream burst overhead parameter sets according to different levels of link quality, and use one of the upstream burst overhead parameter sets;

Wherein, N is an integer and is larger than zero.

the switching module is further configured to: while or after receiving the indication from the first parameter acquisition module, receive a switching index value of the upstream burst overhead parameters which is sent from the OLT to the ONU via a downstream frame and are set in a tag field assigned for a bandwidth of the ONU by the optical line terminal; and, the switching module is configured to start to use the upstream burst overhead parameters after the switching time indicated by the OLT according to the following manner: after receiving the switching index value, using the upstream burst overhead parameters in a next frame; or the switching module is further configured to: while or after receiving the indication from the first parameter acquisition module, receive a hyper frame number notified by the OLT to the ONU; and, the switching module is configured to start to use the upstream burst overhead parameters after the switching time indicated by the OLT according to the following manner: after a frame indicated by the hyper frame number arrives, starting to use the upstream burst overhead parameters; or the switching module is further configured to: while or after receiving the indication from the first parameter acquisition module, notify a hyper frame number to the ONU; and, the ONU is configured to start to use the upstream burst overhead parameters after the switching time determined by the ONU itself according to the following method: after a frame indicated by the hyper frame number arrives, start to use the upstream burst overhead parameters.

In order to solve the above-mentioned method, the present invention also provides an optical line terminal (OLT) for managing the upstream burst overhead parameters, and the OLT comprises: a second parameter acquisition module and a switching time transceiving module, wherein:

The second parameter acquisition module is configured to:
detect transmission quality of a downlink between the OLT and an ONU, send the transmission quality to the ONU, and receive upstream burst overhead parameters suitable for the ONU determined by the ONU according to the transmission quality sent by the OLT; or, detect transmission quality of a downlink between the OLT and an ONU, determine upstream burst overhead parameters suitable for the ONU according to the transmission quality, and notify the determined upstream burst overhead parameters suitable for the ONU to the ONU; or, receive transmission quality of a downlink detected and sent by an ONU, determine the upstream burst overhead parameters suitable for the ONU according to the transmission quality, and notify the determined upstream burst overhead parameters suitable for the ONU to the ONU; or, receive upstream burst overhead parameters suitable for an ONU which are sent and determined by the ONU according to transmission quality of a downlink detected and acquired by the ONU itself; and while or after notifying the determined upstream burst overhead parameters suitable for the ONU to the ONU, or while or after receiving the upstream burst overhead parameters suitable for the ONU sent by the ONU, indicate switching time transceiving module;

The switching time transceiving module is configured to:
while or after receiving an indication from the second parameter acquisition module, indicate the switching time to the ONU or receive the switching time sent by the ONU, so that the ONU start to use the upstream burst overhead parameters after the switching time.

A upstream burst overhead parameter set acquisition module, configured to: determine and identify N kinds of upstream burst overhead parameter sets according to different levels of link quality; wherein, N is an integer and is larger than zero; and send a parameter value or an identification of one default upstream burst overhead parameter set to the ONU, or, send the parameter values or the identifications of more than one upstream burst overhead parameter set to the ONU, so that the ONU can receive the parameter value or the identification of one upstream burst overhead parameter set in a waiting state and use this upstream burst overhead parameter set; or, the ONU can receive the parameter values or the identifications of more than one upstream burst overhead parameter set in a waiting state and use one of them.

The switching time transceiving module is configured to indicate the switching time to the ONU according to the following manner: setting a switching index value of the upstream burst overhead parameters in a tag field assigned for a bandwidth of the ONU, and sending the switching index value to the ONU via a downstream frame, so that after the ONU receives the switching index value, the ONU uses the upstream burst overhead parameters in a next frame; Or, the switching time transceiving module is configured to indicate the switching time to the ONU according to the following manner: notifying a hyper frame number to the ONU, so that the ONU starts to use the upstream burst overhead parameters after a frame indicated by the hyper frame number arrives; or, the switching time transceiving module is configured to receive the switching time sent by the ONU according to the following method: receiving a hyper frame number notified by the ONT, so that the ONU starts to use the upstream burst overhead parameters after a frame indicated by the hyper frame number arrives.

The present invention is able to improve the bandwidth utilization and decrease the complexity of indicating the upstream burst overhead parameters in the PON system, thereby the ONU and the OLT can flexibly and simply select the upstream burst overhead parameters.

PREFERRED EMBODIMENTS OF THE PRESENT INVENTION

Figure 1:
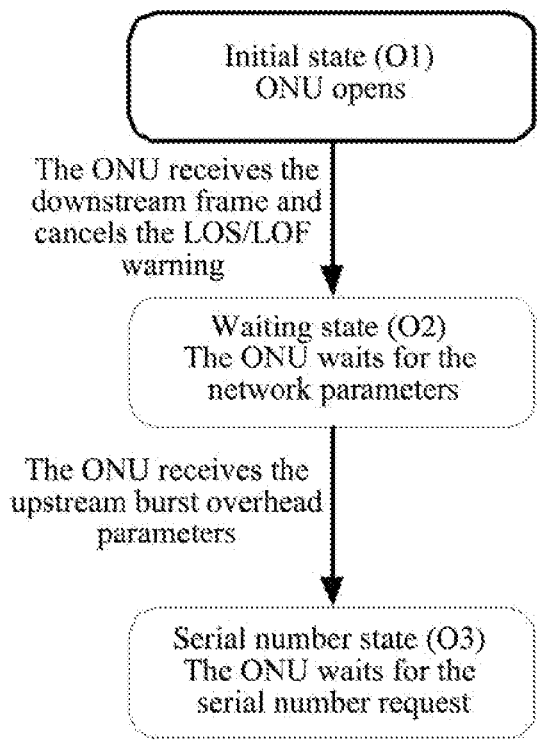
FIG. 1 is a schematic diagram of an OLT periodically broadcasting upstream burst overhead parameters in a GPON system in the prior art.
Figure 2:
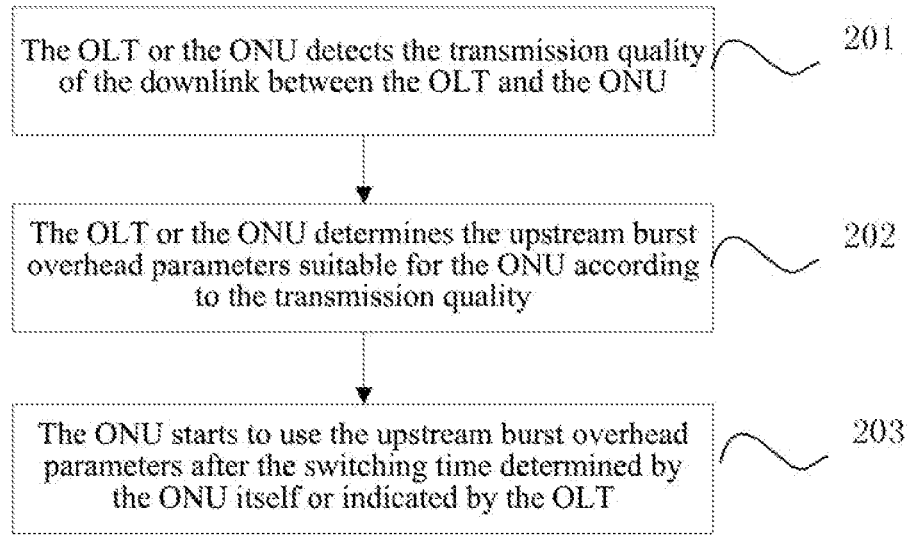
FIG. 2 is a schematic diagram of a method for managing upstream burst overhead parameters between optical access nodes in accordance with an embodiment of the present invention.

As shown in FIG. 2, a method for managing upstream burst overhead parameters between optical access nodes includes the following steps:

Step 201, an OLT or an ONU detects transmission quality of a downlink between the OLT and the ONU when the ONU is at a serial number state (i.e., O3 state);

Step 202, the OLT or the ONU determines upstream burst overhead parameters suitable for using by the ONU according to the transmission quality; and Step 203, the ONU starts to use the upstream burst overhead parameters after switching time is indicated by the OLT or determined by the ONU itself.

The method of the present invention will be described in detail in the following.

In the method of the present invention, when the ONU is at an initial state (i.e., O1 state), the OLT determines and identifies N kinds of upstream burst overhead parameter sets according to different levels of the link quality, wherein N is an integer and is larger than zero. Each upstream burst overhead parameter set includes the following parameters: state of forward error correction, delimiter, preamble and guard band.

The OLT sends a parameter value or an identification of one default upstream burst overhead parameter set to the ONU, and the ONU receives the parameter value or the identification of the upstream burst overhead parameter set in a waiting state (i.e., O2 state) and uses that upstream burst overhead parameter set; or, the OLT sends parameter values or identifications of more than one upstream burst overhead parameter set to the ONU, and after the ONU receives the parameter values or the identifications of more than one upstream burst overhead parameter set in the O2 state, it uses one of the upstream burst overhead parameter sets. When there is a plurality of the upstream burst overhead parameter sets, one of them can be set as a default set. After the ONU receives parameters of more than one upstream burst overhead parameter set, it can select the default set or any one from the more than one upstream burst overhead parameter set to use.

The OLT can unicast the upstream burst overhead parameter set to a specific ONU or broadcast to all ONUs.

In steps 201 and 202, in the case that the OLT detects the downlink between the OLT and the ONU, the OLT acquires the quality information of that downlink by detecting the downlink, determines the upstream burst overhead parameter set used by the ONU according to the quality information of that downlink, and notifies the parameter value in the upstream burst overhead parameter set or the identification of the upstream burst overhead parameter set to the ONU via a unicast message or a broadcast message;

Or, in steps 201 and 202, in the case that the ONU detects the downlink between the OLT and the ONU, the ONU acquires the quality information of that downlink by detecting the downlink, and notifies the quality information of the downlink to the OLT; the OLT determines the upstream burst overhead parameter set used by the ONU according to the quality information of the downlink, and notifies the parameter value in the upstream burst overhead parameter set or the identification of the upstream burst overhead parameter set to the ONU via a unicast message or a broadcast message;

Or, in steps 201 and 202, in the case that the ONU detects the downlink between the OLT and the ONU, the upstream burst overhead parameter set used by the ONU also can be determined by the ONU itself. The ONU acquires the quality information of that downlink by detecting the downlink, determines the upstream burst overhead parameter set used by the ONU according to the quality information of the downlink, and notifies the parameter value in the upstream burst overhead parameter set or the identification of the upstream burst overhead parameter set to the OLT via a unicast message or a broadcast message.

In step 203, the OLT can notify the ONU to switch by a switching index value. Specifically, while or after the OLT notifies the determined upstream burst overhead parameter set to the ONU, the OLT sets the switching index value of the upstream burst overhead parameters in the tag field assigned for the bandwidth of the ONU and sends to the ONU via a downstream frame. After the ONU receives the switching index value, it uses the upstream burst overhead parameters in the next frame;

Or, in step 203, the OLT also can notify the ONU to switch by indicating a hyper frame number. Specifically, while or after the OLT notifies the determined upstream burst overhead parameter set to the ONU, the OLT notifies the hyper frame number to the ONU, and after the ONU receives the hyper frame number, it starts to use the upstream burst overhead parameters after a hyper frame indicated by the hyper frame number arrives;

In step 203, the ONU can also determine the hyper frame number and notify it to the OLT. While or after the ONU notifies the determined upstream burst overhead parameter set to the OLT, the ONU notifies the hyper frame number to the OLT, and the ONU starts to use the upstream burst overhead parameters after the hyper frame indicated by the hyper frame number arrives.

The method of the present invention will be described below with embodiments. In the following embodiments, suppose the OLT determines three kinds of upstream burst overhead parameter sets according to the link quality, wherein, set 1 includes the general upstream burst overhead parameters which are parameters used in default and also correspond to parameters required by the typical link quality, and the index value is set as 0b00; set 2 includes the enhanced upstream burst overhead parameters which correspond to parameters used in situations that the link quality is worse than the typical link quality, and the index value is set as 0b01; and set 3 includes the weakened upstream burst overhead parameters which correspond to parameters used in situations that the link quality is better than the typical link quality, and the index value is set as 0b10. Only three kinds of sets are illustrated herein, however, more than three corresponding parameter levels can be defined according to the practical condition of the link quality, so as to set various one-to-one correspondence upstream burst overhead parameter sets. Configuration of parameter sets in the subsequent embodiments can use the same method.

The First Embodiment

In the first embodiment, the OLT broadcasts the default upstream burst overhead parameter set to the ONU, and after the ONU enters into the O3 state, it detects the quality of the downlink between the ONU and the OLT, and notifies the detected link quality signal to the OLT; the OLT determines the upstream burst overhead parameter set suitable for using by the ONU according to that quality signal, notifies the upstream burst overhead parameter set to the ONU via a unicast message, and also indicates for switching in the tag field assigned for the bandwidth of the ONU; and after the ONU receives the above message, it uses the parameters in that received upstream burst overhead parameter set in the subsequent upstream frame.

Figure 3:
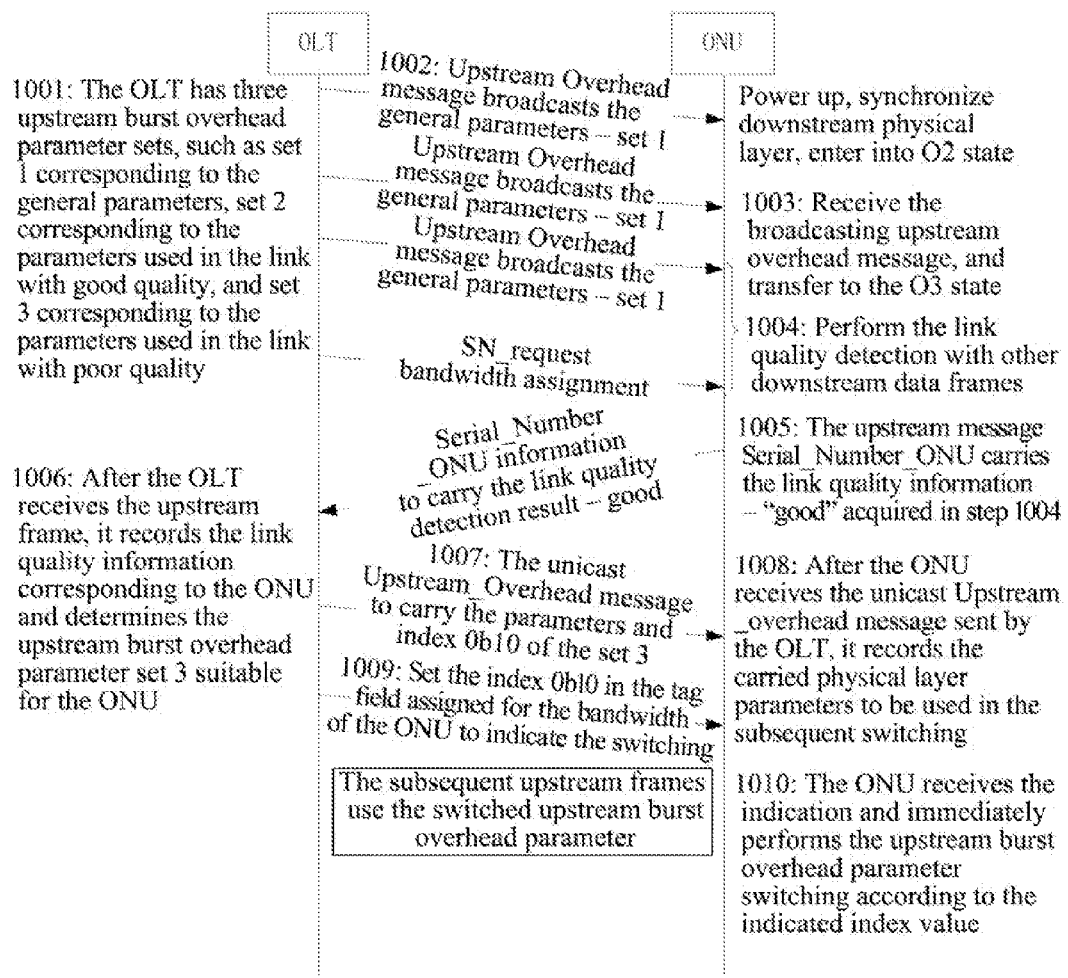
FIG. 3 is a schematic diagram of a method for managing upstream burst overhead parameters in accordance with the first embodiment.

As shown in FIG. 3, the first embodiment specifically includes the following steps.

Step 1001, the OLT determines each upstream burst overhead parameter set.

Step 1002, the OLT broadcasts an Upstream_overhead message carrying the parameters in the general upstream burst overhead parameter set (i.e., set 1) in a downstream direction.

The Upstream_overhead message may carry the parameters or the identification of that set 1.

That message can be sent once or time after time, which is not limited in the present invention.

Step 1003, the ONU is powered up, receives the Upstream_overhead message sent by the OLT in the O2 state, and transfers to the O3 state after successfully acquiring the carried upstream burst overhead parameters.

Step 1004, from the O3 state, the ONU starts to analyze the transmission quality of the downlink, acquiring result by using a currently general bit interleaved parity (BIP) detection method or a frequently used FEC result and the number of correction bits. In the present invention, the ONU may use other similar detection methods to acquire the transmission quality information of the downlink. Suppose that the result of the quality of the link detected by the ONU is good.

Step 1005, the ONU carries the result of quality detection (or evaluation) for the downlink by the ONU in the subsequent upstream frame (here the upstream frame uses the general upstream burst overhead parameters received in the step 1003) and reports the result to the OLT.

For example, when the ONU responds the serial number request bandwidth assignment (SN_Request) sent by the OLT in the O3 state, the link quality information—"good" acquired in step 1004 is carried in the upstream message "Serial_Number_ONU", as shown in Table 1.

TABLE 1

| Serial_Number_ONU ONU serial number information | | |
|---|---|---|
| Octet | Content | Description |
| 1 | 11111111 | =11111111: ONU-ID is not assigned, broadcast message |
|  | ONU-ID | ONU-ID is assigned, filled with value of ONU-ID, unicast message |

TABLE 1-continued

| Serial_Number_ONU ONU serial number information | | |
|---|---|---|
| Octet | Content | Description |
| 2 | 00000001 | Message type: "ONU serial number information" |
| 3-6 | VID1-VID4 | Equipment provider identification: bit1-bit4 |
| 7-10 | VID2 | Serial number information bit1-bit4 defined by equipment provider |
| 11 | RRRRRRRR | High 8 bits of random experiment |
| 12 | RRRRAATT | RRRR = low 4 bits of random experiment AA: link quality measurement result notified to OLT by ONU, where it is set as "01" corresponding to "good" (00 - OLT neglects 01 - link quality is good 10 - link quality is OK 11 - link quality is poor) TT = ONU transmission power TT = 00 - Low Power TT = 01 - Medium Power TT = 10 - High Power TT = 11 - Reserved |
| 13-20 | Reserve | Reserved |

Using the Serial_number_ONU message to carry that information is only an example. Idle bits in other upstream frame message can also be used to be endowed with the similar definition of the "AA" in the above table for notifying the OLT the link detection result, or a specifically defined message is used to transmit that detection result.

Step 1006, after the OLT receives that upstream frame, it records the link quality information corresponding to the ONU and determines the upstream burst overhead parameter set (e.g., set 3 in this embodiment) suitable for using by the ONU.

Step 1007, after the ONU is assigned with the ONU_ID, the OLT sends the parameter set to be used by the ONU and the corresponding index value to the ONU via a unicast Upstream_overhead message, as shown in Table 2:

TABLE 2

| Upstream_Overhead message upstream burst overhead parameters | | |
|---|---|---|
| Octet | Content | Description |
| 1 | ONU-ID | ONU identification |
| 2 | 00000001 | Message identification "upstream burst overhead parameters" |
| 3 | 000000ss | ss is the index value of the parameter set included in the message 00: parameter set 1 01: parameter set 2 10: parameter set 3 11: Reserved |
| 4 | Gggggggg | The number of guard band bits |
| 5 | Xxxxxxxx | The number of preamble bits |
| 6-8 | Bbbbbbbb bbbbbbbb Bbbbbbbb | Delimiter bit1-bit3 |
| 9-10 | Xxxxxxxx xxxxxxxx Xxxxxxxx | xx = reserved: |
| 11-12 | Dddddddd Dddddddd | Pre-assigned delay parameters |
| 13-20 | Reserve | Reserved |

Step 1008, after the ONU receives the unicast Upstream_overhead message sent by the OLT, the ONU records the physical layer parameters and the index value 0b10 of the set 3 carried by the message.

Step 1009, the OLT sets a switching index value of the upstream burst overhead parameters in the tag field assigned for the bandwidth of the ONU and sends the switching index value to the ONU via the downstream frame.

Step 1010, once the ONU receives the switching indication from step 1009, it immediately performs switching of the upstream burst overhead parameters in the next frame according to the indicated index value, and then uses the switched upstream burst overhead parameters in the subsequent upstream transmission.

The Second Embodiment

In the second embodiment, the OLT broadcasts the default upstream burst overhead parameter set to the ONU; and after the ONU enters into the O3 state, the OLT detects the quality of the downlink between the ONU and the OLT, determines the upstream burst overhead parameter set suitable for using by the ONU according to that quality signal, and notifies it to the ONU via the unicast message; the OLT also indicates to switch in the tag field assigned for the bandwidth of the ONU; and after the ONU receives the message, it uses the parameters in the received upstream burst overhead parameter set in the subsequent upstream frames.

Figure 4:
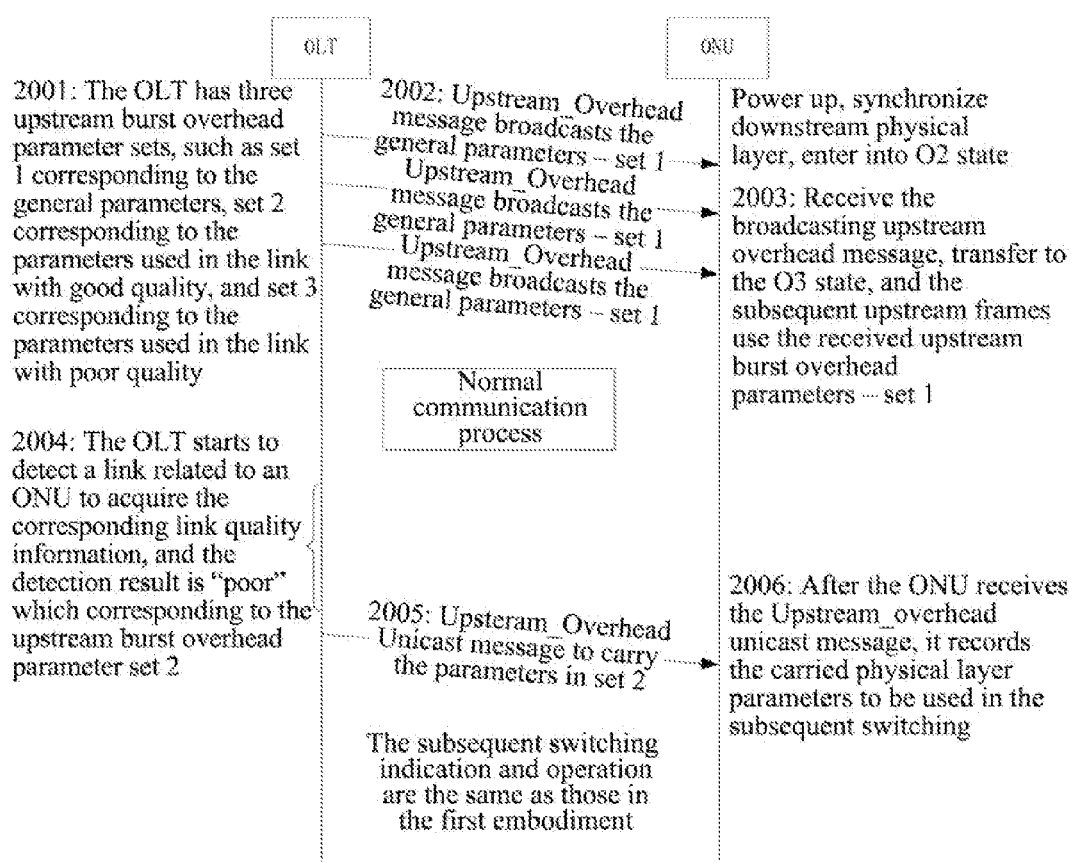
FIG. 4 is a schematic diagram of a method for managing upstream burst overhead parameters in accordance with the second embodiment.

As shown in FIG. 4, the second embodiment specifically includes the following steps.

Step 2001, the OLT determines each upstream burst overhead parameter set.

Step 2002, the OLT broadcasts the Upstream_overhead message carrying the parameters in the general upstream burst overhead parameter set (i.e., set 1) in a downstream direction.

The Upstream_overhead message can carry the parameters or the identification of that set 1. That message can be sent once or time after time, which is not limited in the present invention.

Step 2003, the ONU is powered up, receives the Upstream_overhead message sent by the OLT in the O2 state, and after the ONU successfully acquires the upstream physical layer burst overhead parameters carried by the message, it transfers to the O3 state. The ONU performs normally data communication with the OLT in accordance with the specification constituted by standard (in the prior art).

Step 2004, the OLT starts to detect a link corresponding to a certain ONU to acquire its link quality information, and the detection result is "poor", which corresponds to the upstream burst overhead parameter set 2.

In this step, the conditions of starting to detect can be various, and the conditions can be: increasing of upstream frame error codes, losing of the upstream frames or detecting required actively by an operator. The detection method by the OLT can adopt the currently general BIP or the frequently used FEC, or any other similar detection method that can acquire the related information.

Step 2005, the OLT transmits the upstream burst overhead parameter set 2 to be used by the ONU to the ONU via the unicast Upstream_overhead message, as shown in Table 3:

TABLE 3

| Upstream_Overhead message upstream burst overhead parameters | | |
|---|---|---|
| Octet | Content | Description |
| 1 | ONU-ID | ONU identification |
| 2 | 00000001 | Message identification "upstream burst overhead parameters" |
| 3 | gggggggg | The number of guard band bits |
| 4 | xxxxxxxx | The number of preamble bits |

TABLE 3-continued

| Upstream_Overhead message upstream burst overhead parameters | | |
|---|---|---|
| Octet | Content | Description |
| 5-7 | bbbbbbbb bbbbbbbb bbbbbbbb | Delimiter bit1-bit3 |
| 8-10 | xxxxxxxx xxxxxxxx xxxxxxxx | xx = reserved: |
| 11-12 | dddddddd dddddddd | Pre-assigned delay parameters |
| 13-20 | Reserve | Reserved |

Step 2006, after the ONU receives the unicast Upstream_overhead message sent by the OLT, the ONU records the physical layer parameters carried by the message, so that the physical layer parameters are to be used in the subsequent switching.

The subsequent switching indication and operation can be the same as those in the first embodiment.

The Third Embodiment

The difference between the third embodiment and the second embodiment is that the OLT broadcasts all parameter sets to the ONU in advance in the third embodiment.

Figure 5:
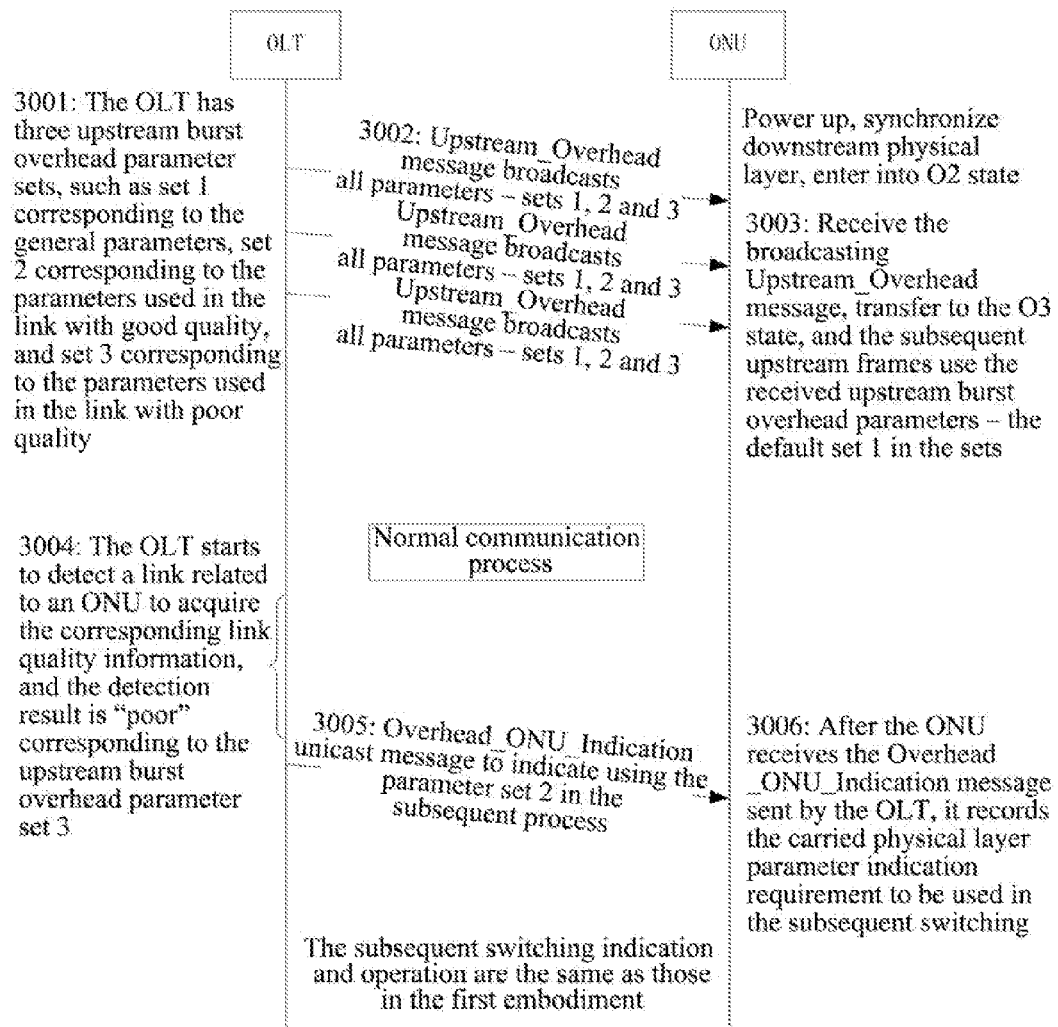
FIG. 5 is a schematic diagram of a method for managing upstream burst overhead parameters in accordance with the third embodiment.

As shown in FIG. 5, the third embodiment specifically includes the following steps.

Step 3001, it is the same as step 2001;

Step 3002, the OLT broadcasts the Upstream_overhead message carrying all the upstream burst overhead parameters (i.e., sets 1, 2 and 3 are sent in one message) in a downstream direction. As shown in Table 4, that message can be sent once or time after time, which is not limited in the present invention.

TABLE 4

| Upstream_Overhead message upstream burst overhead parameters | | |
|---|---|---|
| Octet | Content | Description |
| 1 | 11111111 | broadcast message type |
| 2 | 00000001 | Message identification: "upstream burst overhead parameters" |
| 3-7 | gggggggg gggggggg gggggggg gggggggg gggggggg | Upstream burst overhead parameters -- set 1, which is also the default parameter set |
| 8-12 | xxxxxxxx xxxxxxxx xxxxxxxx xxxxxxxx xxxxxxxx | Upstream burst overhead parameters -- set 2, which is to be used corresponding to the link having poor transmission quality |
| 13-17 | bbbbbbbb bbbbbbbb bbbbbbbb bbbbbbbb bbbbbbbb | Upstream burst overhead parameters -- set 3, which is to be used corresponding to the link having good transmission quality |
| 18-19 | dddddddd dddddddd | Pre-assigned delay parameters |
| 20 | Reserve | Reserved |

Step 3003, the ONU is powered up, receives the Upstream_overhead message sent by the OLT in the O2 state, and after the ONU successfully acquires all the upstream physical layer burst overhead parameter sets carried by the message, it transfers to the O3 state. Without any definite indication, the ONU uses the parameter set 1 by default. The ONU performs normal data communication in accordance with the specification constituted by standard (in the prior art).

Step 3004, it is the same as step 2004;

Step 3005, the OLT transmits the upstream burst overhead parameter set 2 to be used by the ONU to the ONU via the unicast message Upstream_overhead. The message format is shown as Table 5, wherein "BB" should be valued as "01".

TABLE 5

Overhead_ONU_Indication message
upstream burst overhead parameter indication message

| Octet | Content | Description |
|---|---|---|
| 1 | ONU-ID | ONU identification |
| 2 | 00000001 | Message identification "upstream burst overhead parameter indication" |
| 3 | 000000BB | BB: which upstream burst overhead parameter set adopted by the ONU indicated by the OLT<br>00: set 1<br>01: set 2<br>10: set 3<br>11: Reserved |
| 4-20 | Reserve | Reserved |

Step 3006, after the ONU receives the unicast ONU overhead indication (Overhead_ONU_Indication) message sent by the OLT, it records the physical layer parameter BB(01) carried by the message and performs parameter switching subsequently according to the indication. The subsequent switching indication and operation are the same as those in the first embodiment.

The Fourth Embodiment

The difference between the fourth embodiment and the first embodiment is that the OLT broadcasts all parameter sets to the ONU in advance in the third embodiment.

Figure 6:
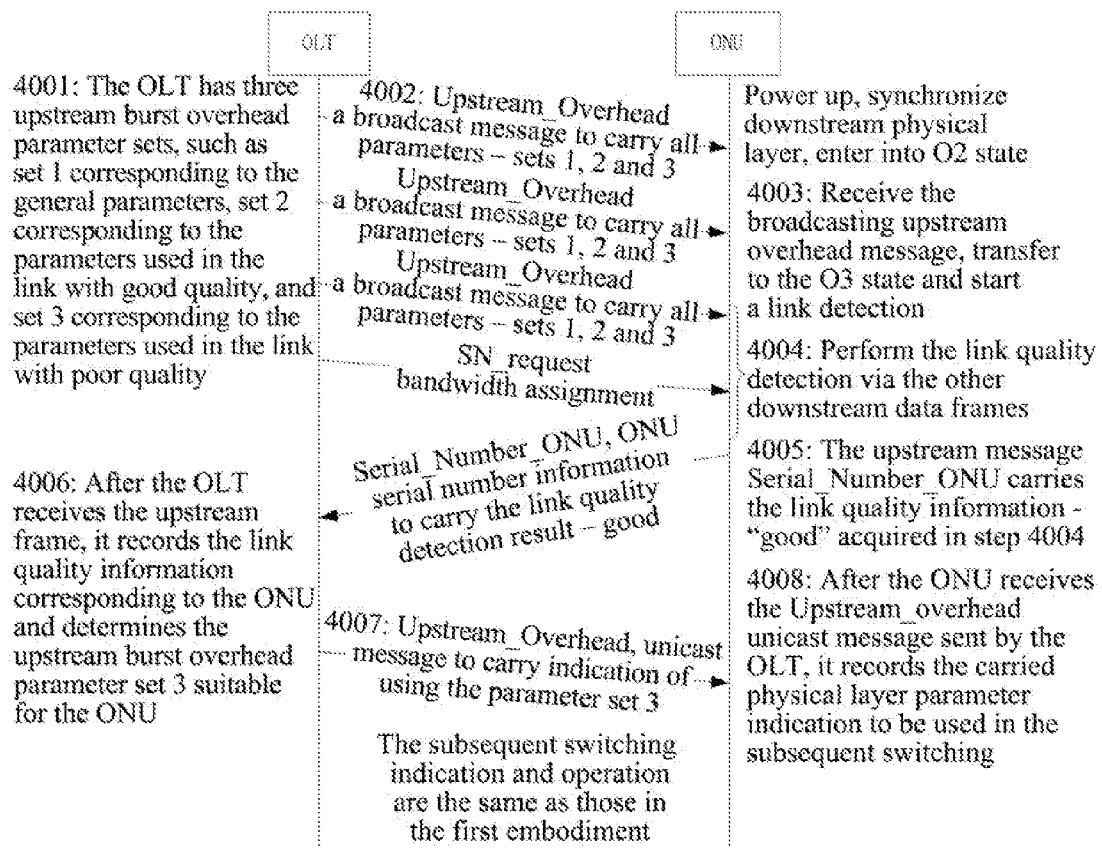
FIG. 6 is a schematic diagram of a method for managing upstream burst overhead parameters in accordance with the fourth embodiment.

As shown in FIG. 6, the fourth embodiment specifically includes the following steps.

Step 4001, it is the same as step 1001;

Step 4002, the OLT broadcasts the Upstream_overhead message carrying all the upstream burst overhead parameter sets (i.e., sets 1, 2 and 3 are sent in one message) in a downstream direction, and the message, as shown in Table 6. The message can be sent once or time after time, which is not limited in the present invention.

TABLE 6

Upstream_Overhead message
upstream burst overhead parameters

| Octet | Content | Description |
|---|---|---|
| 1 | 11111111 ONU-ID | =11111111: ONU-ID is not assigned, broadcast message ONU-ID is assigned, filled with ONU-ID value, unicast message |
| 2 | 00000001 | Message identification: "Upstream burst overhead parameters" |
| 3 | 000000xx | xx: when this message is a unicast message, which upstream burst overhead parameter set adopted by ONU indicated by OLT<br>00: set 1<br>01: set 2<br>10: set 3<br>11: Reserved<br>When this message is a broadcast message, xx is invalid and the ONU neglects it |
| 4-8 | gggggggg<br>gggggggg | Upstream burst overhead parameters -- set 1, which is also the default parameter set |

TABLE 6-continued

Upstream_Overhead message
upstream burst overhead parameters

| Octet | Content | Description |
|---|---|---|
| 9-13 | gggggggg<br>gggggggg<br>gggggggg<br>xxxxxxxx<br>xxxxxxxx<br>xxxxxxxx<br>xxxxxxxx<br>xxxxxxxx | Upstream burst overhead parameters -- set 2, which is to be used corresponding to the link having poor transmission quality |
| 14-18 | bbbbbbbb<br>bbbbbbbb<br>bbbbbbbb<br>bbbbbbbb<br>bbbbbbbb | Upstream burst overhead parameters -- set 3, which is to be used corresponding to the link having good transmission quality |
| 19-20 | dddddddd<br>dddddddd | Pre-assigned delay parameters |

Step 4003, it is the same as step 1003;

Step 4004, it is the same as step 1004;

Step 4005, it is the same as step 1005; When the ONU responds the serial number request bandwidth assignment (SN_request) sent by the OLT in the O3 state, the ONU carries, in the Serial_Number_ONU, the link quality information—"good" acquired in step 1004, as shown in Table 7.

TABLE 7

Serial_Number_ONU
ONU serial number information

| Octet | Content | Description |
|---|---|---|
| 1 | 11111111 ONU-ID | =11111111: ONU-ID is not assigned<br>ONU-ID is assigned, filled with value of ONU-ID |
| 2 | 00000001 | Message type: "ONU serial number information" |
| 3-6 | VID1-VID4 | Equipment provider identification: bit1-bit4 |
| 7-10 | VID2 | Serial number information bit1-bit4 defined by equipment provider |
| 11 | RRRRRRRR | High 8 bits of random experiment |
| 12 | RRRRAATT | RRRR = low 4 bits of random experiment<br>AA: link quality measurement result notified to OLT by ONU, where it sets as "01" corresponding to "good"<br>(00 - OLT neglects<br>01 - link quality is good<br>10 - link quality is OK<br>11 - link quality is poor)<br>TT = ONU transmission power<br>TT = 00 - Low Power<br>TT = 01 - Medium Power<br>TT = 10 - High Power<br>TT = 11 - Reserved |
| 13-20 | Reserve | Reserved |

(Using the Serial_number_ONU message to carry that information is only an example. Idle bits in other upstream frame message can also be used to be endowed with the similar definition of the "AA" in the above table for notifying the OLT the link detection result, or a specifically defined message is used to transmit that detection result.)

Step 4006, it is the same as step 1006;

Step 4007, after the ONU is assigned with the ONU-ID, the OLT indicates via the unicast Upstream_overhead message ("xx" in the unicast message is set as "10") that the upstream burst overhead parameters to be used by the ONU is the set 3, as shown in Table 8.

TABLE 8

Upstream_Overhead message
upstream burst overhead parameters

| Octet | Content | Description |
|---|---|---|
| 1 | 11111111 ONU-ID | =11111111: ONU-ID is not assigned, broadcast message ONU-ID is assigned, filled with value of ONU-ID, unicast message |
| 2 | 00000001 | Message identification: "Upstream burst overhead parameters" |
| 3 | 000000xx | xx: when this message is a unicast message, which upstream burst overhead parameter set adopted by ONU indicated by OLT<br>00: set 1<br>01: set 2<br>10: set 3<br>11: Reserved<br>When this message is a broadcast message, xx is invalid and the ONU neglects it |
| 4-8 | ggggggggg<br>ggggggggg<br>ggggggggg<br>ggggggggg<br>ggggggggg | Upstream burst overhead parameters -- set 1, which is also the default parameter set |
| 9-13 | xxxxxxxx<br>xxxxxxxx<br>xxxxxxxx<br>xxxxxxxx<br>xxxxxxxx | Upstream burst overhead parameters -- set 2, which is to be used corresponding to the link having poor transmission quality |
| 14-18 | bbbbbbbb<br>bbbbbbbb<br>bbbbbbbb<br>bbbbbbbb<br>bbbbbbbb | Upstream burst overhead parameters -- set 3, which is to be used corresponding to the link having good transmission quality |
| 19-20 | dddddddd<br>dddddddd | Pre-assigned delay parameters |

Step 4008, after the ONU receives the Upstream_overhead unicast message sent by the OLT, the ONU records the upstream burst overhead parameter indication carried by the message, and uses in the subsequent switching. The subsequent switching indication and operation are the same as those in the first embodiment.

The Fifth Embodiment

The difference between the fifth embodiment and the third embodiment is that, in the fifth embodiment, after the OLT detects the quality of the downlink, it notifies the ONU to record the upstream burst overhead parameters to be switched to and the switching hyper frame number via broadcast channel message Overhead_ONU_indication; and after the frame corresponding to the hyper frame number arrives, all ONUs switch to use the upstream burst overhead parameters indicated by the OLT to perform upstream transmission.

Figure 7:
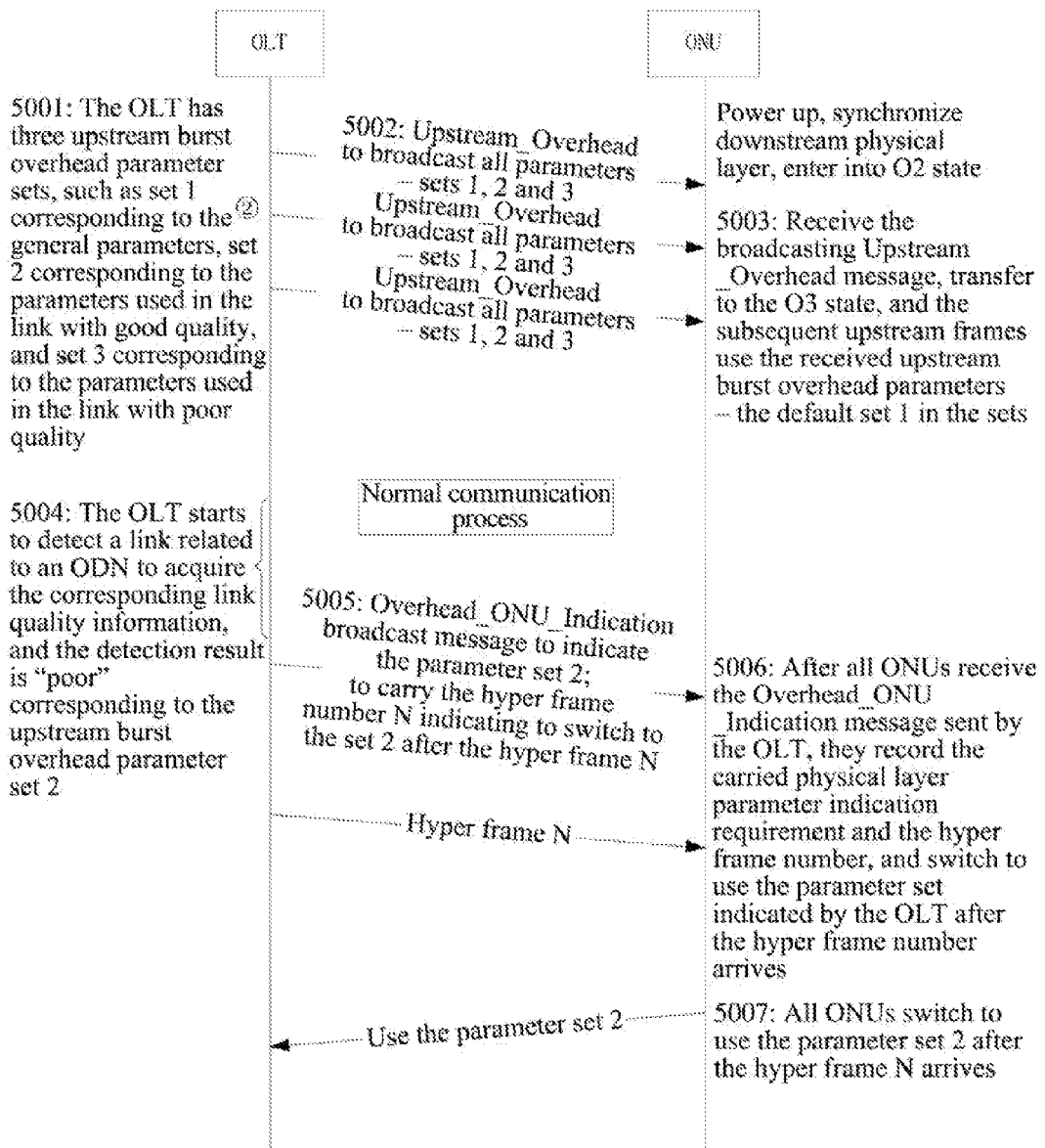
FIG. 7 is a schematic diagram of a method for managing upstream burst overhead parameters in accordance with the fifth embodiment.

As shown in FIG. 7, the fifth embodiment specifically includes the following steps.

Steps 5001-5004, they are the same as steps 3001-3004.

Step 5005, the OLT transmits the upstream burst overhead parameter set 2 to be switched used by all ONUs as well as the hyper frame number which is used to perform the parameter switching, via the broadcast Overhead_ONU_Indication message. The message has the following message format, wherein BB should be valued as "01". The hyper frame number field (4-7) is filled with the value of the hyper frame number that needs to be switched, as shown in Table 9.

TABLE 9

Overhead_ONU_Indication message
upstream burst overhead parameter indication message

| Octet | Content | Description |
|---|---|---|
| 1 | 11111111 | Broadcast message type |
| 2 | 00000001 | Message ID "Upstream burst overhead parameter indication" |
| 3 | 000000BB | BB: which kind of upstream burst overhead parameter set adopted by ONU indicated by OLT<br>00: set 1<br>01: set 2<br>10: set 3<br>11: Reserved |
| 4-7 | ssssssss<br>ssssssss<br>ssssssss<br>ssssssss | The hyper frame number that the OLT requires all ONUs to switch, wherein, before the hyper frame arrives, all ONUs switch to use the upstream burst overhead parameters indicated by the OLT to perform upstream transmission |
| 8-20 | Reserve | Reserved |

Step 5006, after all ONUs receive the Overhead_ONU_Indication message broadcasted by the OLT, all ONUs record the physical layer parameter BB(01) and the hyper frame number that indicates the switching time carried in the message, and the parameter switching is performed subsequently according to the indication.

Step 5007, after the downstream frame corresponding to the subsequent hyper frame number arrives, the ONU performs switching operation of the upstream burst overhead parameter, and the parameters after the switching is used in upstream transmission.

This embodiment can be simply modified, that is, the message in steps 5005-5006 is designed as a unicast message to support the switching of a single ONU rather than all ONUs.

The Sixth Embodiment

The difference between the sixth embodiment and the fifth embodiment is that: in the sixth embodiment, after the OLT detects the quality of the downlink, it notifies the ONUs to record the upstream burst overhead parameters to be switched and the switching hyper frame number, via the broadcast channel message Overhead_ONU_indication; the OLT sets the switching index values of the upstream burst overhead parameters in the tag fields assigned for the bandwidths of all ONUs; and after the ONUs receive this switching indication, they perform the upstream burst overhead parameter switching in the next frame according to the indicated index value.

Figure 8:
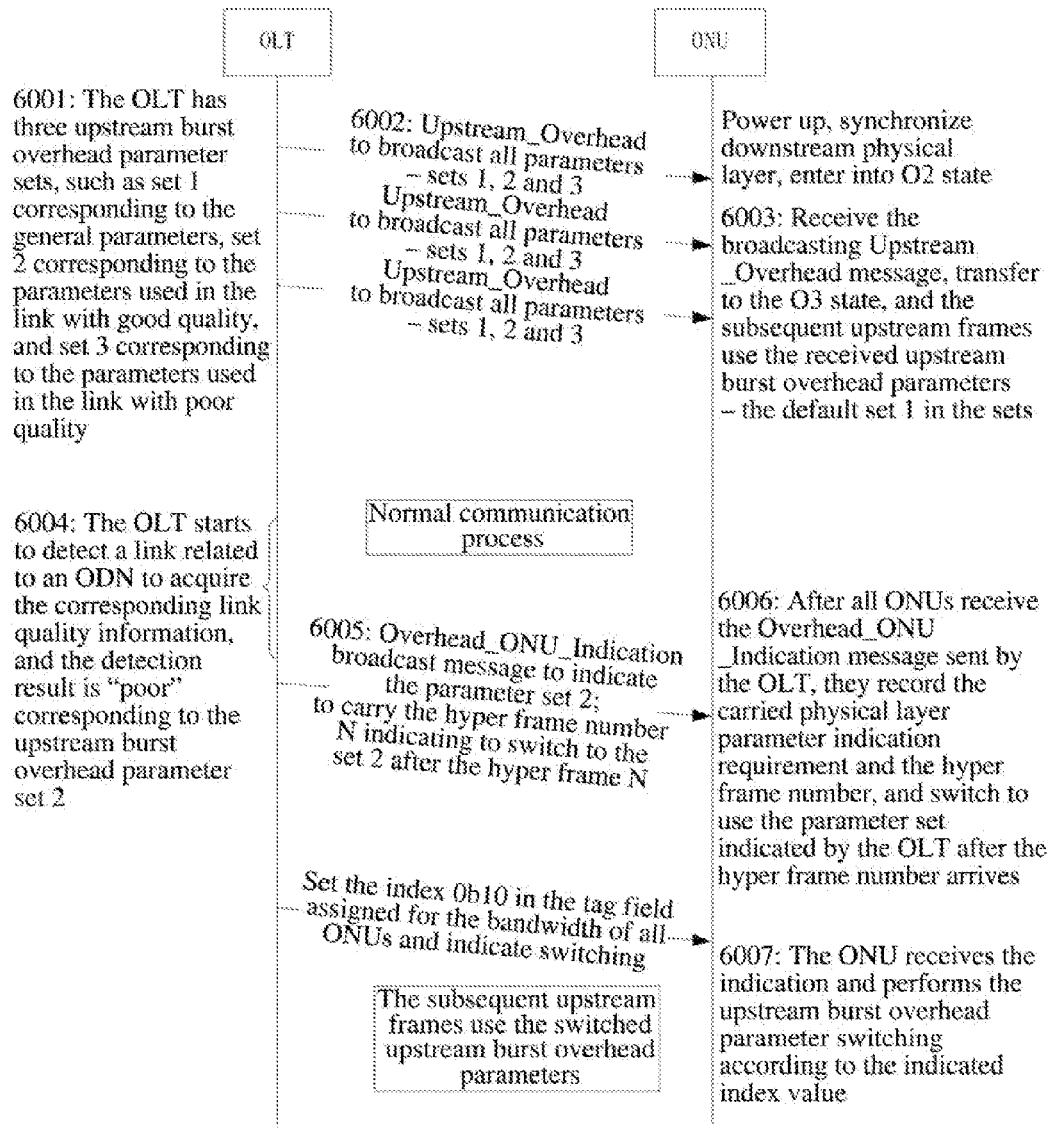
FIG. 8 is a schematic diagram of a method for managing upstream burst overhead parameters in accordance with the sixth embodiment.

As shown in FIG. 8, the sixth embodiment specifically includes the following steps.

Steps 6001-6006, they are the same as steps 5001-5006.

Step 6007, the OLT sets the switching index values of the upstream burst overhead parameters in the tag fields assigned for the bandwidths of all ONUs and sends them to all ONUs via a downstream frame.

Once all ONUs receive the switching indication in step 6007, they perform the upstream burst overhead parameter switching immediately in the next frame according to the indicated index values, so that the switched parameters can be used in the subsequent upstream transmission.

This embodiment can be modified simply, that is, the message in steps 6005/6006/6007 is designed as a unicast message and is set according to a certain ONU, to support the switching of a single ONU rather than all ONUs.

The Seventh Embodiment

In the seventh embodiment, the ONU tests the quality of the link and determines the upstream burst overhead parameters used by the ONU itself according to the quality of the link, and the ONU notifies the OLT the upstream burst overhead parameters and indicates the switching hyper frame number.

Figure 9:
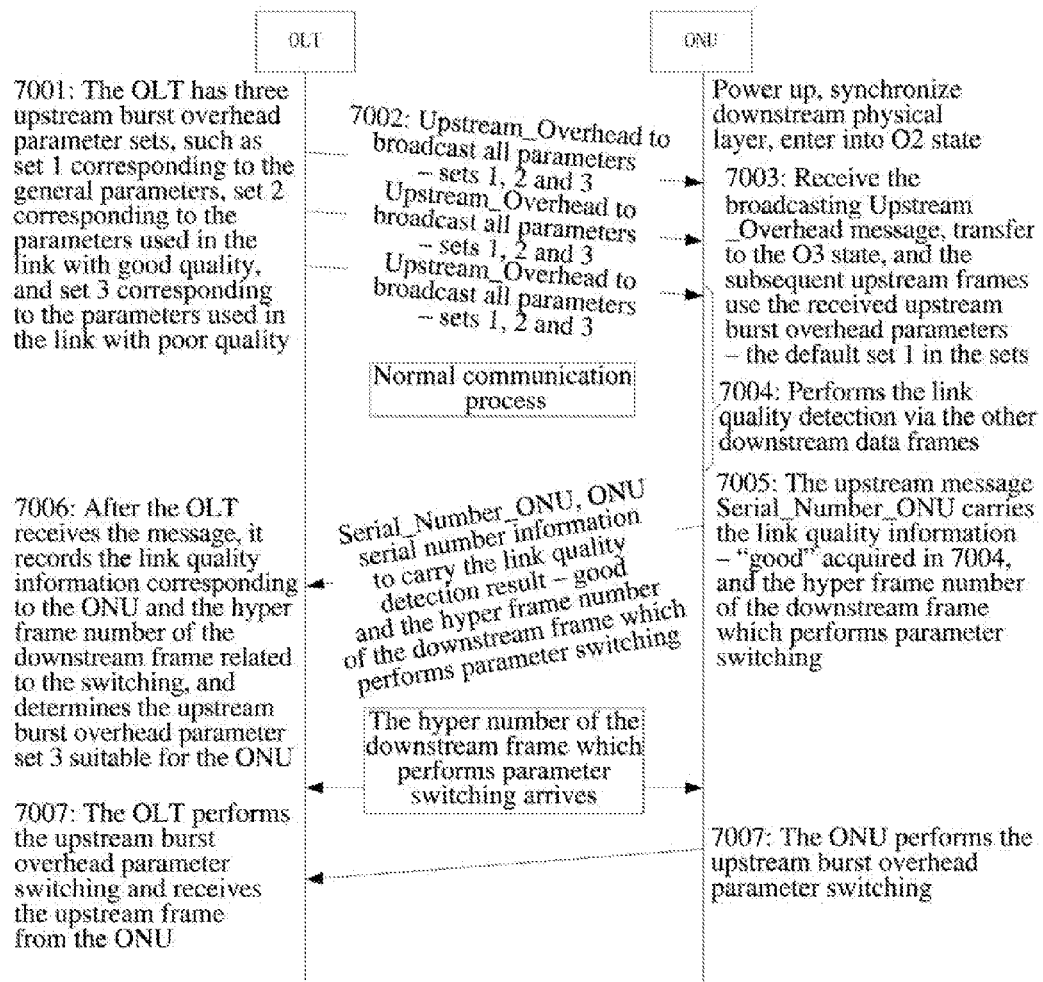
FIG. 9 is a schematic diagram of a method for managing upstream burst overhead parameters in accordance with the seventh embodiment.

As shown in FIG. 9, the seventh embodiment specifically includes the following steps.

Steps 7001-7002, they are the same as steps 6001-6002.

Step 7003, the ONU is powered up, and receives the Upstream_overhead message sent by the OLT in the O2 state, and after successfully acquiring the upstream physical layer burst overhead parameters carried in the message, the ONU transfers to the O3 state.

Step 7004, from the O3 state, the ONU starts to analyze the transmission quality of the downlink, acquiring result by using the currently general BIP detection method or the frequently used FEC result and the number of correction bits. (The ONU can also use other similar detection method to acquire the transmission quality information of the downlink, as long as the method works). Suppose the result of the measurement is good.

Step 7005, after the ONU acquires the transmission quality information in step 7004, the subsequent upstream frame carries the detection result "good" by the ONU detecting the quality of the downlink; and the ONU determines the upstream burst overhead parameter set (i.e., set 3) according to the link quality, and then the ONU reports the determined upstream burst overhead parameter set 3 and the hyper frame number which represents the set 3 ready for switching to be used. For example, when the ONU responds the serial number request bandwidth assignment (SN_Request) sent by the OLT in the O3 state, the link quality information—"good" acquired in step 7004 is carried in the upstream message "Serial_Number_ONU", as shown in Table 10.

TABLE 10

Serial_Number_ONU
ONU serial number information

| Octet | Content | Description |
|---|---|---|
| 1 | 11111111 ONU-ID | =11111111: ONU-ID is not assigned, broadcast message ONU-ID is assigned, filled with value of ONU-ID, unicast message |
| 2 | 00000001 | Message type: "ONU serial number information" |
| 3-6 | VID1-VID4 | Equipment provider ID: bit1-bit4 |
| 7-10 | VID2 | Serial number information bit1-bit4 defined by equipment provider |
| 11 | RRRRRRRR | High 8 bits of random experiment |
| 12 | RRRRAATT | RRRR = low 4 bits of random experiment AA: link quality measurement result notified to OLT by ONU, where it is set as "01" corresponding to "good" (00 - OLT neglects 01 - link quality is good 10 - link quality is OK 11 - link quality is poor) TT = ONU transmission power TT = 00 - Low Power TT = 01 - Medium Power TT = 10 - High Power TT = 11 - Reserved |
| 13-16 | ssssssss ssssssss ssssssss ssssssss | Hyper frame number of downstream frame which represents the parameter set 3 switched to be used by ONU. After the OLT sends the downstream frame corresponding to the hyper frame number, it uses new upstream burst overhead parameters to receive the upstream frames of the ONU. |
| 17-20 | Reserve | Reserved |

Using the Serial_number_ONU message to carry the information is only an example. Idle bits in other upstream frame message can also be used to be endowed with the similar definition of the related field in the above table to notify the OLT the link detection result and the hyper frame number of the downstream frame related to the switching, or a specifically defined message is used to transmit the detection result.

Step 7006, after the OLT receives the message, it records the link quality information corresponding to that ONU and the hyper frame number of the downstream frame related to the switching, and determines the upstream burst overhead parameter set 3 suitable for used by the ONU.

Step 7007, after the OLT sends the downstream frame corresponding to the hyper frame number at a certain time, the ONU switches to use the parameter set 3 to send the upstream frame here, and the OLT uses the parameter set 3 to receive the upstream frames of that ONU.

The above methods can improve the bandwidth utilization and decrease the complexity of indicating the upstream burst overhead parameters in the PON system, so that the OLT and the ONU can flexibly and simply select the upstream burst overhead parameters.

The PON system for managing the upstream burst overhead parameters in the present invention comprises an OLT or an ONU, wherein, the functions of these two entities are the same as those described in the above methods. The detail description is as follows:

The OLT is configured to: detect the transmission quality of the downlink between the OLT and the ONU, determine the upstream burst overhead parameters suitable for the ONU according to the transmission quality and notify the parameters to the ONU; and indicate the switching time to the ONU; and The ONU is configured to: detect the transmission quality of the downlink between the OLT and the ONU, determine the suitable upstream burst overhead parameters according to the transmission quality, or, directly receive, from the OLT, the transmission quality of the downlink determined by the OLT; and start to use the upstream burst overhead parameters after the switching time determined by the ONU itself or indicated by the OLT.

The OLT is further configured to determine and identify N kinds of upstream burst overhead parameter sets according to different levels of link quality, wherein N is an integer and is larger than zero. The OLT further used to send the parameter value or the identification of one default upstream burst overhead parameter set to the ONU, or, to send the parameter values or the identifications of more than one upstream burst overhead parameter set to the ONU. The ONU is further configured to: receive the parameter value or the identification of one upstream burst overhead parameter set in the waiting state and use this upstream burst overhead parameter set; or, after receiving the parameter values or the identifications of more than one upstream burst overhead parameter set in the waiting state, use one of the upstream burst overhead parameter sets.

The OLT is further configured to: while or after notifying the determined upstream burst overhead parameter set to the ONU, set the switching index value of the upstream burst overhead parameters in the tag field assigned for the bandwidth of the ONU and sending it to the ONU via a downstream frame. The ONU is further used to use the upstream burst overhead parameters in the next frame after receiving the switching index value.

The OLT is further configured to: while or after notifying the determined upstream burst overhead parameter set to the ONU, notify the ONU the hyper frame number. The ONU is further configured to start to use the upstream burst overhead parameters after the frame indicated by the hyper frame number arrives.

The ONU is further configured to: while or after notifying the determined upstream burst overhead parameter set to the OLT, notify the OLT the hyper frame number, and start to use the upstream burst overhead parameters after the frame indicated by the hyper frame number arrives.

Based on the above system, the present invention also provides an optical network unit (ONU) for managing the upstream burst overhead parameters, and the ONU comprises a first parameter acquisition module and a switching module; wherein:

the first parameter acquisition module is configured to:

detect the transmission quality of the downlink between the OLT and the ONU or receive the transmission quality of the downlink detected and sent by the OLT, determine the upstream burst overhead parameters suitable for the ONU according to the transmission quality, and send the upstream burst overhead parameters suitable for the ONU to the OLT; or detect the transmission quality of the downlink between the OLT and the ONU, send the transmission quality to the OLT, and receive the upstream burst overhead parameters suitable for the ONU which are determined according to the transmission quality and sent by the OLT; or, directly receive, from the OLT, the upstream burst overhead parameters suitable for the ONU determined by the OLT; and while or after notifying the determined upstream burst overhead parameters suitable for the ONU to the OLT, or, while or after receiving the upstream burst overhead parameters suitable for the ONU sent by the OLT, indicate the switching module; and the switching module is configured to:

while or after receiving an indication from the first parameter acquisition module, determine the switching time or receive the switching time indicated by the OLT, and start to use the upstream burst overhead parameters suitable for the ONU after the switching time determined by the ONU itself or indicated by the OLT.

The ONU further comprises a burst overhead parameter set receiving module; wherein:

the burst overhead parameter set receiving module is configured to:

receive, in the waiting state, the parameter value or the identification of one default upstream burst overhead parameter set sent by the OLT to the ONU, wherein the default upstream burst overhead parameter set is one of N kinds of upstream burst overhead parameter sets determined and identified by the OLT according to different levels of link quality, and use this upstream burst overhead parameter set; or, receive, in the waiting state, the parameter values or the identifications of more than one upstream burst overhead parameter set sent by the OLT to the ONU, wherein the upstream burst overhead parameter sets is one or more of N kinds of upstream burst overhead parameter sets determined and identified by the OLT according to different levels of link quality, and use one of the upstream burst overhead parameter sets;

wherein N is an integer and is larger than zero.

The switching module is further configured to: while or after receiving the indication from the first parameter acquisition module, receive the switching index value of the upstream burst overhead parameters which is set in the tag field assigned for the bandwidth of the ONU by the OLT and is sent by the OLT to the ONU via a downstream frame; and the switching module is configured to start to use the upstream burst overhead parameters after the switching time indicated by the OLT according to the following manner: after receiving the switching index value, using the upstream burst overhead parameters in the next frame; or The switching module is further configured to: while or after receiving the indication from the first parameter acquisition module, receive the hyper frame number notified to the ONU by the OLT; and the switching module is configured to start to use the upstream burst overhead parameters after the switching time indicated by the OLT according to the following manner: starting to use the upstream burst overhead parameters after the frame indicated by the hyper frame number arrives; or, The switching module is further configured to: while or after receiving the indication from the first parameter acquisition module, notify the OLT the hyper frame number; and the ONU is configured to start to use the upstream burst overhead parameters after the switching time determined by the ONU itself according to the following manner: starting to use the upstream burst overhead parameters after the frame indicated by the hyper frame number arrives.

Based on the above-mentioned system, the present invention also provides an optical line terminal (OLT) for managing the upstream burst overhead parameters, and the OLT comprises a second parameter acquisition module and a switching time transceiving module, wherein:

the second parameter acquisition module is configured to:

detect the transmission quality of the downlink between the OLT and an optical network unit (ONU), send the transmission quality to the ONU, and receive the upstream burst overhead parameters suitable for the ONU determined by the ONU according to the transmission quality sent by the OLT; or, detect the transmission quality of the downlink between the OLT and the ONU, determine the upstream burst overhead parameters suitable for the ONU according to the transmission quality, and notify the ONU the determined upstream burst overhead parameters suitable for the ONU; or, receive the transmission quality of the downlink detected and sent by the ONU, determine the upstream burst overhead parameters suitable for the ONU according to the transmission quality, and notify the ONU the determined upstream burst overhead parameters suitable for the ONU; or, receive from the ONU the upstream burst overhead parameters suitable for the ONU determined according to the transmission quality of the downlink detected and acquired by the ONU itself; and while or after notifying the ONU the determined upstream burst overhead parameters suitable for the ONU, or, while or after receiving from the ONU the upstream burst overhead parameters suitable for the ONU, indicate the switching time transceiving module; and the switching time transceiving module is configured to:

while or after receiving an indication from the second parameter acquisition module, indicate the switching time to the ONU or receive the switching time sent by the ONU, so that the ONU starts to use the upstream burst overhead parameters after the switching time.

The OLT further comprises:

an upstream burst overhead parameter set acquisition module, which is configured to: determine and identify N kinds of upstream burst overhead parameter sets according to different levels of link quality, wherein, N is an integer and is larger than zero; and send the parameter value or the identification of one default upstream burst overhead parameter set to the ONU, or, send the parameter values or the identifications of more than one upstream burst overhead parameter set to the ONU, so that the ONU receives the parameter value or the identification of one upstream burst overhead parameter set in the waiting state and uses this upstream burst overhead parameter set; or, the ONU receives the parameter values or the identifications of more than one upstream burst overhead parameter set in the waiting state and uses one of them.

The switching time transceiving module is configured to indicate the switching time to the ONU according to the following manner: setting the switching index value of the upstream burst overhead parameters in the tag field assigned for the bandwidth of the ONU, and sending it to the ONU via a downstream frame, so that after the ONU receives the switching index value, it uses the upstream burst overhead parameters in the next frame; or, the switching time transceiving module is configured to indicate the switching time to the ONU according to the following manner: notify the ONU the hyper frame number, so that the ONU starts to use the upstream burst overhead parameters after the frame indicated by the hyper frame number arrives; or, the switching time transceiving module is configured to receive the switching time sent by the ONU according to the following manner: receiving the hyper frame number notified by the ONU, so that the ONU starts to use the upstream burst overhead parameters after the frame indicated by the hyper frame number arrives.

The above description is only the preferred embodiments of the present invention and is not intended to limit the present invention. For those skilled in the art, the description of the above scheme in the present invention can be modified or changed. Without departing from the spirit and essence of the present invention, all these kinds of modification, equivalent or variations should belong to the scope of the appending claims of the present invention.

INDUSTRIAL APPLICABILITY

The present invention can improve the bandwidth utilization, decrease the complexity of indicating the upstream burst overhead parameters in the PON system, thereby the ONU and the OLT can flexibly and simply select the upstream burst overhead parameters.

What is claimed is:

1. A method for managing upstream burst overhead parameters, comprising:
    an optical line terminal or an optical network unit detecting transmission quality of a downlink between the optical line terminal and the optical network unit;
    the optical line terminal or the optical network unit determining the upstream burst overhead parameters suitable for the optical network unit according to the transmission quality; and
    the optical network unit starting to use the upstream burst overhead parameters suitable for the optical network unit after switching time determined by the optical network unit itself or indicated by the optical line terminal;
    wherein, before the step of the optical line terminal or the optical network unit detecting the transmission quality of the downlink between the optical line terminal and the optical network unit, the method further comprises:
    the optical line terminal determining and identifying N kinds of upstream burst overhead parameter sets according to different levels of link quality, wherein N is an integer and is larger than zero; and the optical line terminal sending a parameter value or an identification of one default upstream burst overhead parameter set to the optical network unit; and the optical network unit receiving the parameter value or the identification of the upstream burst overhead parameter set in a waiting state and using the upstream burst overhead parameter set; or, the optical line terminal sending parameter values or identifications of more than one upstream burst overhead parameter set to the optical network unit; and the optical network unit receiving the parameter values or the identifications of the upstream burst overhead parameter sets in a waiting state and using one of the received upstream burst overhead parameter sets.

2. The method of claim 1, wherein:
after the step of the optical network unit receiving the parameter value(s) or the identification(s) of the upstream burst overhead parameter set(s), the method further comprises: the optical network unit entering into a serial number state;
the step of the optical line terminal detecting the transmission quality of the downlink between the optical line terminal and the optical network unit comprises: in the serial number state of the optical network unit, the optical line terminal detecting the downlink between the optical network unit and the optical line terminal to acquire quality information of the downlink;
the step of the optical line terminal determining the upstream burst overhead parameters suitable for the optical network unit according to the transmission quality comprises: the optical line terminal determining the upstream burst overhead parameter set suitable for the optical network unit according to the quality information of the downlink, and notifying the parameter value(s) or the identification(s) of the upstream burst overhead parameter set(s) suitable for the optical network unit to the optical network unit via a unicast message or a broadcast message.

3. The method of claim 1, wherein:
after the step of the optical network unit receiving the parameter value(s) or the identification(s) of the upstream burst overhead parameter set(s), the method further comprises: the optical network unit entering into a serial number state;
the step of the optical network unit detecting the transmission quality of the downlink between the optical line terminal and the optical network unit comprises: in the serial number state of the optical network unit, the optical network unit detecting the downlink between the optical network unit and the optical line terminal to acquire quality information of the downlink;
after the step of acquiring the quality information of the downlink, the method further comprises: the optical network unit notifying the quality information of the downlink to the optical line terminal;
the step of the optical line terminal determining the upstream burst overhead parameters suitable for the optical network unit according to the transmission quality comprises: the optical line terminal determining the upstream burst overhead parameter set suitable for the optical network unit according to the quality information of the downlink, and notifying the parameter value(s) or the identification(s) of the upstream burst overhead parameter set(s) suitable for the optical network unit to the optical network unit via a unicast message or a broadcast message.

4. The method of claim 1, wherein:
after the step of the optical network unit receiving the parameter value(s) or the identification(s) of the upstream burst overhead parameter set(s), the method further comprises: the optical network unit entering into a serial number state;
the step of the optical network unit detecting the transmission quality of the downlink between the optical line terminal and the optical network unit comprises: in the serial number state of the optical network unit, the optical network unit detecting the downlink between the optical network unit and the optical line terminal to acquire quality information of the downlink;
The step of the optical network unit determining the upstream burst overhead parameters suitable for the optical network unit according to the transmission quality comprises: the optical network unit determining the upstream burst overhead parameter set suitable for the optical network unit according to the quality information of the downlink, and notifying the parameter value(s) or the identification(s) of the upstream burst overhead parameter set(s) suitable for the optical network unit to the optical line terminal via a unicast message or a broadcast message.

5. The method of claim 2, wherein:
while or after the optical line terminal notifies the parameter value(s) or the identification(s) of the determined upstream burst overhead parameter set(s) to the optical network unit, or while or after the optical network unit notifies the parameter value(s) or the identification(s) of the upstream burst overhead parameter set(s) to the optical line terminal, the method further comprises: the optical line terminal setting a switching index value of the upstream burst overhead parameters in a tag field assigned for a bandwidth of the optical network unit, and sending the switching index value to the optical network unit via a downstream frame; the step of the optical network unit starting to use the upstream burst overhead parameters after the switching time indicated by the optical line terminal comprises: after the optical network unit receives the switching index value, the optical network unit using the upstream burst overhead parameters suitable for the optical network unit in a next frame; or,
while or after the optical line terminal notifies the parameter value(s) or the identification(s) of the determined upstream burst overhead parameter set(s) to the optical network unit, or while or after the optical network unit notifies the parameter value(s) or the identification(s) of the upstream burst overhead parameter set(s) to the optical line terminal, the method further comprises: the optical line terminal notifying a hyper frame number to the optical network unit; the step of the optical network unit starting to use the upstream burst overhead parameters after the switching time indicated by the optical line terminal comprises: after the optical network unit receives the hyper frame number and after a frame indicated by the hyper frame number arrives, the optical network unit starting to use the upstream burst overhead parameters suitable for the optical network unit; or,
while or after the optical line terminal notifies the parameter value(s) or the identification(s) of the determined upstream burst overhead parameter set(s) to the optical network unit, or while or after the optical network unit notifies the parameter value(s) or the identification(s) of the upstream burst overhead parameter set(s) to the optical line terminal, the method further comprises: the optical network unit notifying a hyper frame number to the optical line terminal; the step of the optical network unit starting to use the upstream burst overhead parameters after the switching time determined by the optical network unit itself comprises: after a frame indicated by the hyper frame number arrives, the optical network unit starting to use the upstream burst overhead parameters suitable for the optical network unit.

6. The method of claim 2, wherein:
the upstream burst overhead parameter set comprises: state of forward error correction, delimiter, preamble and guard band.

7. The method of claim 1, wherein:
in the step of the optical line terminal sending the parameter values or the identifications of more than one upstream burst overhead parameter set to the optical network unit, the optical line terminal sends the parameter values or the identifications of one or more upstream burst overhead parameter sets to all optical network units or one or more optical network units which communicate with the optical line terminal.

8. The method of claim 3, wherein:
while or after the optical line terminal notifies the parameter value(s) or the identification(s) of the determined upstream burst overhead parameter set(s) to the optical network unit, or while or after the optical network unit notifies the parameter value(s) or the identification(s) of the upstream burst overhead parameter set(s) to the optical line terminal, the method further comprises: the optical line terminal setting a switching index value of the upstream burst overhead parameters in a tag field assigned for a bandwidth of the optical network unit, and sending the switching index value to the optical network unit via a downstream frame; the step of the optical network unit starting to use the upstream burst overhead parameters after the switching time indicated by the optical line terminal comprises: after the optical network unit receives the switching index value, the optical network unit using the upstream burst overhead parameters suitable for the optical network unit in a next frame; or,
while or after the optical line terminal notifies the parameter value(s) or the identification(s) of the determined upstream burst overhead parameter set(s) to the optical network unit, or while or after the optical network unit notifies the parameter value(s) or the identification(s) of the upstream burst overhead parameter set(s) to the optical line terminal, the method further comprises: the optical line terminal notifying a hyper frame number to the optical network unit; the step of the optical network unit starting to use the upstream burst overhead parameters after the switching time indicated by the optical line terminal comprises: after the optical network unit receives the hyper frame number and after a frame indicated by the hyper frame number arrives, the optical network unit starting to use the upstream burst overhead parameters suitable for the optical network unit; or,
while or after the optical line terminal notifies the parameter value(s) or the identification(s) of the determined upstream burst overhead parameter set(s) to the optical network unit, or while or after the optical network unit notifies the parameter value(s) or the identification(s) of the upstream burst overhead parameter set(s) to the optical line terminal, the method further comprises: the optical network unit notifying a hyper frame number to the optical line terminal; the step of the optical network unit starting to use the upstream burst overhead parameters after the switching time determined by the optical network unit itself comprises: after a frame indicated by the hyper frame number arrives, the optical network unit starting to use the upstream burst overhead parameters suitable for the optical network unit.

9. The method of claim 3, wherein:

the upstream burst overhead parameter set comprises: state of forward error correction, delimiter, preamble and guard band.

10. The method of claim 4, wherein:

the upstream burst overhead parameter set comprises: state of forward error correction, delimiter, preamble and guard band.

11. The method of claim 4, wherein:

while or after the optical line terminal notifies the parameter value(s) or the identification(s) of the determined upstream burst overhead parameter set(s) to the optical network unit, or while or after the optical network unit notifies the parameter value(s) or the identification(s) of the upstream burst overhead parameter set(s) to the optical line terminal, the method further comprises: the optical line terminal setting a switching index value of the upstream burst overhead parameters in a tag field assigned for a bandwidth of the optical network unit, and sending the switching index value to the optical network unit via a downstream frame; the step of the optical network unit starting to use the upstream burst overhead parameters after the switching time indicated by the optical line terminal comprises: after the optical network unit receives the switching index value, the optical network unit using the upstream burst overhead parameters suitable for the optical network unit in a next frame; or, while or after the optical line terminal notifies the parameter value(s) or the identification(s) of the determined upstream burst overhead parameter set(s) to the optical network unit, or while or after the optical network unit notifies the parameter value(s) or the identification(s) of the upstream burst overhead parameter set(s) to the optical line terminal, the method further comprises: the optical line terminal notifying a hyper frame number to the optical network unit; the step of the optical network unit starting to use the upstream burst overhead parameters after the switching time indicated by the optical line terminal comprises: after the optical network unit receives the hyper frame number and after a frame indicated by the hyper frame number arrives, the optical network unit starting to use the upstream burst overhead parameters suitable for the optical network unit; or, while or after the optical line terminal notifies the parameter value(s) or the identification(s) of the determined upstream burst overhead parameter set(s) to the optical network unit, or while or after the optical network unit notifies the parameter value(s) or the identification(s) of the upstream burst overhead parameter set(s) to the optical line terminal, the method further comprises: the optical network unit notifying a hyper frame number to the optical line terminal; the step of the optical network unit starting to use the upstream burst overhead parameters after the switching time determined by the optical network unit itself comprises: after a frame indicated by the hyper frame number arrives, the optical network unit starting to use the upstream burst overhead parameters suitable for the optical network unit.

12. An optical network unit for managing upstream burst overhead parameters, comprising a first parameter acquisition module, a switching module and a burst overhead parameter set receiving module; wherein:

the first parameter acquisition module is configured to:

detect transmission quality of a downlink between an optical line terminal and the optical network unit or receive transmission quality of a downlink detected and sent by the optical line terminal, determine upstream burst overhead parameters suitable for the optical network unit according to the transmission quality, and send the upstream burst overhead parameters suitable for the optical network unit to the optical line terminal; or, detect transmission quality of a downlink between an optical line terminal and the optical network unit, send the transmission quality to the optical line terminal, and receive, from the optical line terminal, upstream burst overhead parameters suitable for the optical network unit determined according to the transmission quality; or, directly receive, from an optical line terminal, upstream burst overhead parameters suitable for the optical network unit determined by the optical line terminal; and, while or after notifying the upstream burst overhead parameters suitable for the optical network unit to the optical line terminal, or while or after receiving the upstream burst overhead parameters suitable for the optical network unit sent by the optical line terminal, indicate the switching module;

the switching module is configured to:

while or after receiving an indication from the first parameter acquisition module, determine switching time or receive switching time indicated by the optical line terminal, and start to use the upstream burst overhead parameters suitable for the optical network unit after the switching time determined by itself or indicated by the optical line terminal;

a burst overhead parameter set receiving module, configured to:

receive, in a waiting state, a parameter value or an identification of one default upstream burst overhead parameter set sent by the optical line terminal to the optical network unit after the optical line terminal determines and identifies N kinds of upstream burst overhead parameter sets according to different levels of link quality, and use the upstream burst overhead parameter set; or, receive, in a waiting state, parameter values or identifications of more than one upstream burst overhead parameter set sent by the optical line terminal to the optical network unit after the optical line terminal determines and identifies N kinds of upstream burst overhead parameter sets according to different levels of link quality, and use one of the upstream burst overhead parameter sets;

wherein, N is an integer and is larger than zero.

13. The optical network unit of claim 12, wherein:

the switching module is further configured to: while or after receiving the indication from the first parameter acquisition module, receive a switching index value of the upstream burst overhead parameters which is sent from the optical line terminal to the optical network unit via a downstream frame and are set in a tag field assigned for a bandwidth of the optical network unit by the optical line terminal; and, the switching module is configured to start to use the upstream burst overhead parameters after the switching time indicated by the optical line terminal according to the following manner: after receiving the switching index value, using the upstream burst overhead parameters in a next frame; or the switching module is further configured to: while or after receiving the indication from the first parameter acquisition module, receive a hyper frame number notified by the optical line terminal to the optical network unit; and, the switching module is configured to start to use the upstream burst overhead parameters after the switching time indicated by the optical line terminal according to the following manner: after a frame indicated by the hyper frame number arrives, starting to use the upstream burst overhead parameters; or the switching module is further configured to: while or after receiving the indication from the first parameter acquisition module, notify a hyper frame number to the optical line terminal; and, the optical network unit is configured to start to use the upstream burst overhead parameters after the switching time determined by the optical network unit itself according to the following method: after a frame indicated by the hyper frame number arrives, start to use the upstream burst overhead parameters.

14. An optical line terminal for managing upstream burst overhead parameters, comprising: a second parameter acquisition module, a switching time transceiving module and a upstream burst overhead parameter set acquisition module, wherein:

the second parameter acquisition module is configured to:

detect transmission quality of a downlink between the optical line terminal and an optical network unit, send the transmission quality to the optical network unit, and receive upstream burst overhead parameters suitable for the optical network unit determined by the optical network unit according to the transmission quality sent by the optical line terminal; or, detect transmission quality of a downlink between the optical line terminal and an optical network unit, determine upstream burst overhead parameters suitable for the optical network unit according to the transmission quality, and notify the determined upstream burst overhead parameters suitable for the optical network unit to the optical network unit; or, receive transmission quality of a downlink detected and sent by an optical network unit, determine the upstream burst overhead parameters suitable for the optical network unit according to the transmission quality, and notify the determined upstream burst overhead parameters suitable for the optical network unit to the optical network unit; or, receive upstream burst overhead parameters suitable for an optical network unit which are sent and determined by the optical network unit according to transmission quality of a downlink detected and acquired by the optical network unit itself; and while or after notifying the determined upstream burst overhead parameters suitable for the optical network unit to the optical network unit, or while or after receiving the upstream burst overhead parameters suitable for the optical network unit sent by the optical network unit, indicate switching time transceiving module;

the switching time transceiving module is configured to:

while or after receiving an indication from the second parameter acquisition module, indicate the switching time to the optical network unit or receive the switching time sent by the optical network unit, so that the optical network unit start to use the upstream burst overhead parameters after the switching time;

a upstream burst overhead parameter set acquisition module, configured to: determine and identify N kinds of upstream burst overhead parameter sets according to different levels of link quality; wherein N is an integer and is larger than zero; and send a parameter value or an identification of one default upstream burst overhead parameter set to the optical network unit, or, send parameter values or identifications of more than one upstream burst overhead parameter set to the optical network unit, so that the optical network unit receives the parameter value or the identification of the one upstream burst overhead parameter set in a waiting state and uses the upstream burst overhead parameter set; or, the optical network unit receives the parameter values or the identifications of more than one upstream burst overhead parameter set in a waiting state and uses one of the upstream burst overhead parameter sets.

15. The optical line terminal of claim 14, wherein:

the switching time transceiving module is configured to indicate the switching time to the optical network unit according to the following manner: setting a switching index value of the upstream burst overhead parameters in a tag field assigned for a bandwidth of the optical network unit, and sending the switching index value to the optical network unit via a downstream frame, so that after the optical network unit receives the switching index value, the optical network unit uses the upstream burst overhead parameters in a next frame; or, the switching time transceiving module is configured to indicate the switching time to the optical network unit according to the following manner: notifying a hyper frame number to the optical network unit, so that the optical network unit starts to use the upstream burst overhead parameters after a frame indicated by the hyper frame number from the optical line terminal arrives; or, the switching time transceiving module is configured to receive the switching time sent by the optical network unit according to the following method: receiving a hyper frame number notified by the optical network unit, so that the optical network unit starts to use the upstream burst overhead parameters after a frame indicated by the hyper frame number arrives.

\* \* \* \* \*